United States Patent [19]

Threadgill

[11] Patent Number: 4,708,539

[45] Date of Patent: Nov. 24, 1987

[54] TAP LUBRICATING SYSTEM

[75] Inventor: James A. Threadgill, Rolling Meadows, Ill.

[73] Assignee: Master Chemical Corporation, St. Perrysburg, Ohio

[21] Appl. No.: 800,687

[22] Filed: Nov. 22, 1985

[51] Int. Cl.⁴ .................................. B23B 51/06
[52] U.S. Cl. .................................. 408/61; 407/11; 409/136; 82/DIG. 1
[58] Field of Search ............... 408/56, 61, 59, 234; 409/135, 136; 407/11; 82/DIG. 1; 10/129 R

[56] References Cited

U.S. PATENT DOCUMENTS

| 2,084,022 | 6/1937 | Frank | 408/56 |
| 2,501,738 | 3/1950 | Prutton | 408/6 |
| 3,478,843 | 11/1969 | Eckardt | 408/61 |
| 3,564,944 | 2/1971 | Hill et al. | 408/61 |
| 3,577,808 | 5/1971 | Visser | 408/61 |
| 4,095,916 | 6/1978 | Hammond | 409/136 |

FOREIGN PATENT DOCUMENTS

| 1552498 | 4/1983 | Fed. Rep. of Germany | 408/56 |
| 114645 | 9/1981 | Japan | 409/136 |
| 2060442 | 5/1981 | United Kingdom | 409/136 |

Primary Examiner—Z. R. Bilinsky
Attorney, Agent, or Firm—Freeman Crampton; Alfred L. Patmore, Jr.

[57] ABSTRACT

A self-contained system for applying a viscous tapping fluid to a tapping tool at a machining work site independent of any other cutting fluid system. A supply tank, control cabinet and an air actuating nozzle are interconnected to supply the tapping fluid for a timed period initiated by a limit switch, NC signal or manual command for ready adaptation to equipment ranging from a machining center to dedicated tapping work stations.

7 Claims, 1 Drawing Figure

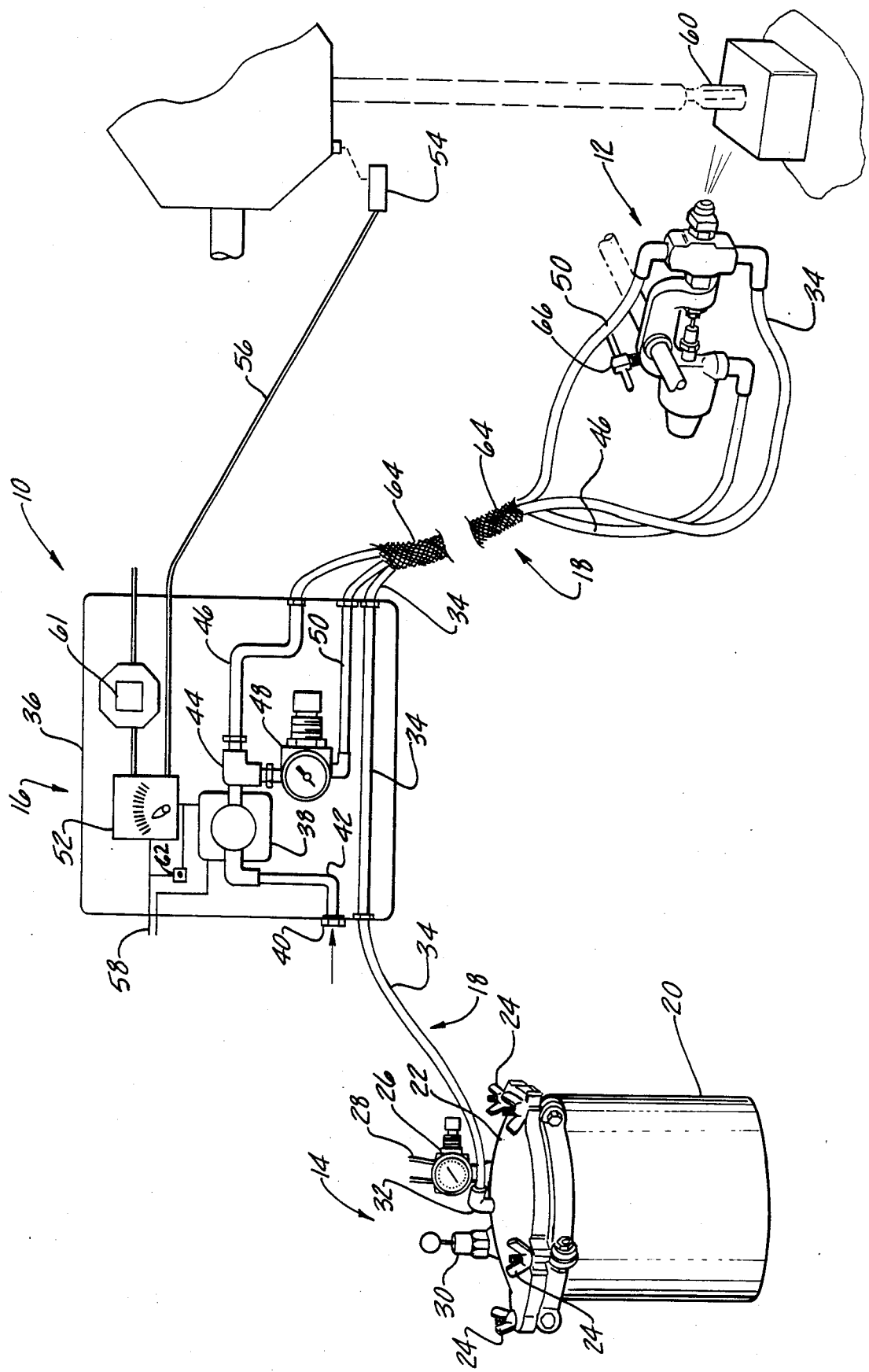

TAP LUBRICATING SYSTEM

This invention pertains to a tapping fluid delivery system and, more particularly, to a self-contained system that can be used independently of a dedicated cutting fluid system.

Commonly, machine tools are equipped with a recirculating cutting fluid system which delivers cutting fluid from a sump to the cutting tool and work to perform at least the dual function of providing adequate lubrication and cooling to prolong tool life, speed up the operation, and provide greater precision in the machining operation. Multi-purpose cutting fluids have been developed to meet these needs for turning, milling, shaping, drilling and similar functions. Typically, when a tapping or cutting operation is encountered requiring slow heavy cuts in tough materials, the conventional cutting fluid is not adequate. A viscous, clinging film of high lubricity is required which often is supplied by hand brushing the tapping fluid on the tap or die.

Hand application of the tapping fluid involves at best a waste of materials and creates a mess. In NC machining centers and automatic screw machines, this results in a considerable loss of time and interruption of an automatic process for hand application of the tapping fluid. The primary objective of this invention is to automate the application of tapping fluid independently of any conventional cutting fluid system.

Another object of this invention is in the automation of the application of tapping fluid in all types of machines from simple dedicated high speed tapping machines to NC machining centers and automatic screw machines.

In conventional cutting fluid recirculation systems, the cutting fluid is delivered to the tool and work in a flooding flow serving to wash chips away and to conduct mass heat transfer. Even timed pulse systems, such as that shown in U.S. Pat. No. 4,095,916 where shop air is used to deliver timed pulses of coolant and lubricant, the work is flooded to wash chips away from the work piece.

Other systems have been designed to minimize the flow requirement such as that shown in U.S. Pat. No. 2,501,738 in which the normal position of the tap and work is reversed (so that the work is on the top and the tap enters from below), and the cutting lubricant is only supplied to the work during the cutting stroke. This minimizes splashing, allowing substantially complete recovery of the fluid for filtration and recirculation.

Few systems have been designed to pulse fluid from a nonrecirculating source. One such system is shown in U.S. Pat. No. 3,564,944 which utilizes a spring loaded plunger with a pair of check valves for dispensing a quantity of cutting fluid on the upstroke of the reciprocating tool. Such a system would be unsuitable for delivery of a viscous cutting fluid. In another system, disclosed in U.S. Pat. No. 3,577,808, designed to deliver sub-zero cutting fluid, pressurized air is utilized at the nozzle but a mist of micronized particles is delivered which aids in instantaneous evaporation and further cooling of the fluid; but this would be totally unacceptable in delivering a coating of viscous tapping fluid to a tool. In this sub-zero system, there is no nozzle shutoff and delivery of the mist is continuous during operation of the drill.

The present invention overcomes the disadvantages of the prior art to emit a timed delivery of an air suspended stream of viscous tapping fluid droplets from an air actuated nozzle. Actuation at the nozzle instantaneously cuts off the supply of tapping fluid to minimize waste, at the same time eliminating the hazards and unsightliness of overflow.

The objects of the invention are realized in an applicator system of this invention which integrates three major components, namely, a normally closed nozzle located at the work site, a supply tank and a control package, the components being interconnected by flexible conduit.

The nozzle is positioned at the work site with the tip of the nozzle directed towards and spaced from the tapping tool a distance from 12 to 18 inches so that the nozzle and the interconnecting conduit will not be hit by chips.

The supply tank for containing the tapping fluid has an air pressure regulator attached to the sealing cover of the tank for introducing air from a pressurized air source, which is typically shop air, to the tank at a predetermined tapping fluid delivery pressure determined by the setting of the air pressure regulator.

The control package is typically located in a control cabinet spaced remote from the work site or nozzle so that it will not be subjected to direct spray. Typically, it is located on the machine tool control panel for ready access by the operator. The control package includes a normally closed solenoid valve having an inlet connected to the pressurized air source and an outlet for the delivery of pressurized air therethrough. A conduit is connected to this outlet for delivery of nozzle actuating air. A suspension air regulator is also connected to the solenoid valve outlet for receiving air from the outlet for delivery of suspension air at a preselected pressure determined by the setting of the air regulator. A timing switch having an inlet and outlet is connected to the coil input of the solenoid valve.

Flexible conduit means interconnects the supply tank and the control package with the nozzle and includes a conduit for delivering tapping fluid from the supply tank to the nozzle at the predetermined fluid pressure. A second conduit delivers suspension air from the suspension air regulator in the control cabinet to the nozzle at the preselected pressure. A third conduit delivers nozzle actuating air from the solenoid valve outlet in the control cabinet to the nozzle. Preferably, the conduit for delivering tapping fluid from the supply tank to the nozzle passes through the control cabinet so that all three conduits are encased in a mesh sleeve between the control cabinet and the nozzle.

During the tapping or threading cycle, the emission of the suspension of tapping fluid droplets from the nozzle is commenced upon the receipt of an initiating signal to the inlet of the timing switch. This opens the solenoid valve to deliver actuating air through nozzle actuating air conduit to open the nozzle and allows the flow of suspension air to be delivered from the suspension air regulator through the suspension air conduit to join with the tapping fluid being delivered to the nozzle from the supply tank through the fluid delivery conduit. The emission continues for a period of time determined by the timing switch. Thereafter, the solenoid valve is closed closing the nozzle.

The initiating signal is provided by an operating switch which typically may be in the form of a limit switch or proximity switch located at the machine tool to sense the positioning of the machine for the tapping operation, or it can be in the form of a command signal from a numerical control, NC, operating the machine tool which is translated in a switching circuit. In the latter case, the switching circuit can take the form of a relay located in the control box receiving the numerical control command signal and providing an input to the timing switch.

A priming switch is provided which bypasses the operating switch and the timing switch for manual operation of the actuating or solenoid valve. This provides a means for setup and fine tuning when the nozzle is positioned and the proper settings of the air pressure regulators are determined.

The presently preferred embodiment of the invention is illustrated in the accompanying drawing in which the single figure presents in schematic form the entire system.

The tapping fluid applicator system 10 includes the three major components including the nozzle 12, the supply tank 14, and the control package 16 all of which are interconnected by flexible conduit means 18.

The supply tank 14 is preferably of a 3-5 gallon capacity and includes a main lower tank section 20 and a lid 22 interconnected with a number of equally spaced quick-release thumb screw type connectors 24. The lid includes a pressure regulator and gauge 26 to which a shop air supply line 28 containing a suitable shutoff valve is connected. Lid 22 also contains a pull ring type safety pressure relief valve 30 and a hose connection 32 for attachment to flexible conduit 34 for delivering tapping fluid from the supply tank to the nozzle. Since all connections are to the lid 22 of supply tank 14, tank portion 20 can be easily moved for filling with a supply of tapping fluid. Shop air supply is usually at 80 psi, and regulator 26 is normally set at a predetermined tapping fluid delivery pressure of 10 to 14 psi.

The control package 16 which incorporates all electrical components is housed in an oil-tight control cabinet 36. Solenoid valve 38 acts as the main air shutoff valve and the valve controlling the supply of actuating air to the nozzle. Valve 38 has an inlet connected to the shop air supply through connector 40 and line 42. The outlet of solenoid valve 38 is connected to tee 44 supplying nozzle actuating air through conduit 46. Suspension air regulator and gauge 48 are also connected to the connector 44 for supplying suspension air at a preselected pressure through conduit 50. While it is preferable to provide tee 44 downstream of or at the outlet of solenoid valve 38 so that the suspension air is turned on and off in cabinet 36, the tee 44 could be located upstream of or at the inlet to solenoid valve 38 so that the air to regulator 48 is not switched or turned on and off.

Located within the control cabinet 36 is electrical timer 52 which regulates the spraying time and is adjustable from a fraction of a second to over a minute. Normally, a spray time of approximately 3 seconds is sufficient to coat the tap with a moderately viscous tapping fluid. The initiating or actuating input to timer 52 is shown as limit switch 54 connected through input lines 56. Actuation of the timer 52 supplies current from the 115 volt AC input line 58 to the coil of the solenoid valve 38 for the preselected time period. At the end of the timed period, the coil is deenergized and the valve is closed.

Limit switch 54 detects when the tapping tool 60 is in position for commencing the threading operation as by contacting a projection on a tool turret face. Other types of switches may be used such as a proximity switch, electric eye or even an operator actuated switch. Likewise, the switch can be a command from a numerical control or computer numerical control associated with the machine tool or transfer station. In this case, a relay 61 can be provided in the input line 56 to act as a switching circuit.

A priming switch 62 is also provided in the cabinet 36 which bypasses the initiating switch 54 and the timer 52 to supply power from the 115 volt AC input line 58 directly to the coil of the solenoid valve 38 for manual operation, primarily for setup or adjustment purposes.

The actuating air conduit 46 and the suspension air conduit 50 have suitable connectors exiting from control box 36, and the tapping fluid conduit 34 is also led through the control box 36 with suitable connectors so that a flexible hose portion of these conduits 34, 36 and 50, can be encased in mesh sleeve 64 between the control cabinet 36 and their connections to nozzle 12. The nozzle 12 is rigidly connected at the work site by clamp 66 and generally positioned 12 to 18 inches away from the tool with the spray thereof directed primarily at the tool with any overspray coating the part to be threaded.

In operation, after all the suitable conduit and electrical connections have been made, and the supply tank 14 filled with tapping fluid, final adjustments are made in the positioning of the nozzle and the adjustment of the suspension air regulator 48. The priming switch 62 is actuated to prime the lines and to make these adjustments. The suspension air pressure will normally be set between 10 to 25 psi to form a droplet spray without forming a mist. Normally the lower the pressure that can be used to project the viscous fluid, the larger the droplets will be, and the more satisfactory the coating of the tapping tool will be. Control of the opening and closing of the nozzle by actuating air at the nozzle produces instantaneous spray and cutoff minimizing waste, and any shortout or shock and fire hazard is eliminated.

The embodiments of the invention in which an exclusive property or privilege is claimed are defined as follows:

1. In a machine tool for performing a machining operation on a work piece at a work site comprising, in combination:
    a tool driven by said machine tool for machining said work piece;
    a tapping fluid applicator system including the following:
    a normally closed dispensing nozzle directed toward said tool at said work site;
    a supply tank for containing said tapping fluid;
    means for supplying tapping fluid from said tank to said nozzle;
    a suspension air pressure regulator;
    control circuit means remote from said work site responsive to a start command for generating a control signal for a preset time period;
    means responsive to said control signal for supplying suspension air through said regulator to said nozzle and for simultaneously opening said normally closed nozzle including means for supplying actuating air to said nozzle for opening said nozzle to emit an air suspension stream of tapping fluid droplets therefrom; and
    wherein said control circuit means comprises:
    an electrically operated actuating valve controlling the supply of actuating air to said nozzle;
    a timing means which determines said preset time interval;

means responsive to said control signal for actuating said electrically operated valve;

whereby during said control signal said valve is opened, supplying actuating air to said nozzle and opening the nozzle thereby commencing the emission of said suspension of tapping fluid from said nozzle for said preset time period determined by said timing means and thereafter closing said valve cutting off the supply of actuating air to said nozzle and the emission of said suspension from said nozzle.

2. The machine tool according to claim 1 wherein the means for supplying suspension air includes a conduit downstream from said actuating valve for delivering a portion of said actuating air to said suspension air regulator.

3. The machine tool according to claim 1 including a limit switch actuated by the movement of the machine tool performing said machining operation to transmit said start command to said control circuit.

4. The machine tool according to claim 1 wherein said start command is generated by a numerical control operating the machine tool performing said machining operation.

5. The machine tool according to claim 4 wherein said control circuit means is located in a control box and includes a control relay located in said control box receiving said start command from said numerical control.

6. The machine tool according to claim 1 further including a priming switch bypassing said means for manual operation of said actuating valve.

7. The machine tool according to claim 1 wherein said means for supplying cutting fluid from said tank to said nozzle includes a tank pressurizing air regulator connected to said tank, means for supplying pressurized air to said regulator, and a conduit for delivery of tapping fluid from said tank to said nozzle, whereby said tank can be pressurized at a predetermined pressure by adjustment of said tank regulator for optimizing delivery of said tapping fluid to said nozzle.

* * * * *